(No Model.)

E. L. SHARPNECK.
CLAMP FOR HOSE.

No. 393,400. Patented Nov. 27, 1888.

WITNESSES:
S. S. Gray,
J. F. Wilber.

INVENTOR,
Eliel L. Sharpneck,
BY D. M. M. Dermott
his
ATTORNEY.

UNITED STATES PATENT OFFICE.

ELIEL L. SHARPNECK, OF DENVER, COLORADO, ASSIGNOR OF ONE-HALF TO JOHN C. BLAKE, OF SAME PLACE.

CLAMP FOR HOSE.

SPECIFICATION forming part of Letters Patent No. 393,400, dated November 27, 1888.

Application filed May 7, 1888. Serial No. 273,102. (No model.)

*To all whom it may concern:*

Be it known that I, ELIEL L. SHARPNECK, a citizen of the United States of America, residing at Denver, in the county of Arapahoe and State of Colorado, have invented certain new and useful Improvements in Clamps for Hose, of which the following is a specification, reference being had therein to the accompanying drawings.

My invention relates to a new and improved construction of clamps for securing a hose or tubing upon a metal connecting-pipe; and its objects are to furnish clamps capable of rigidly and reliably securing together a flexible hose and a metal pipe or tube, simple in construction, readily applied, efficient in operation, and durable; to which ends it consists in the features more particularly hereinafter described and claimed.

Figure 1:
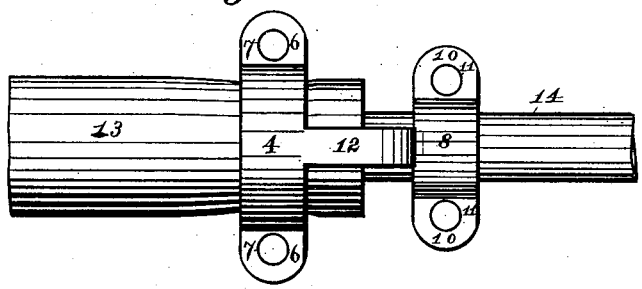
Figure 2:
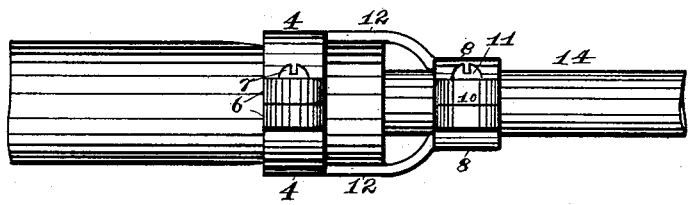
Figure 3:
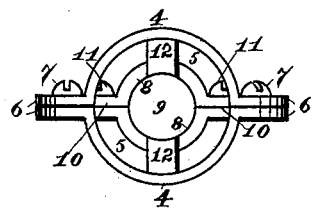

In the drawings is illustrated my improved clamp, Figure 1 being a top view thereof in use; Fig. 2, a side view thereof, also in use; and Fig. 3, an end of the clamp alone.

In these figures the reference numeral 13 indicates the hose or flexible tubing united to the metal tube or pipe 14 by my improved clamp. In such clamp 4 4 are a pair of curved bars, or bars each of which has formed in it one-half of a concave recess, 5, the two together forming clamping-jaws adapted to take upon and grip the hose. At either end of both bars are lugs or ears 6, through which pass or in which take either clamping-screws 7 or nutted bolts, as may be desired.

8 8 are a similar pair of bars or clamping-jaws, each formed with one-half a recess, 9, adapted to take upon and grip the tube to which the hose or pipe is to be secured. They are formed with the lugs or ears 10, in which are seated the clamping-screws 11, or through which may pass ordinary nutted bolts to effect the clamping. The clamping bars or jaws 4 and 8 are united in pairs, one of each by bars 12, extending from one to the other, so that each half of the finished or complete clamp is formed of a jaw, 4, a jaw, 8, and the connecting-bar 12.

In practice the tube or pipe 14 is slipped a suitable distance within the hose or flexible pipe 13, and the jaws of the clamp loosened, so as to permit 4 4 being slipped over the hose and 8 8 over the pipe or tube. The screws or nuts (if bolts be used) are then turned to bring 8 8 tightly upon the pipe or tube and 4 4 tightly upon the hose or flexible pipe. 4 4 sink somewhat into the elastic body of the hose, gripping the hose securely upon the pipe or tube 14, while 8 8 also clamp firmly upon 14. Their conjoint action, united as they are by the connecting-bars 12, secures the hose and the pipe together so firmly and reliably that a steam-tight joint is secured, and so that they cannot be released the one from the other under any of the contingencies likely to happen in ordinary use.

If it should be desired to unite two pieces of hose, the jaws 8 8 may be made of the same size as 4 4, and used to clamp the contiguous ends of two pieces of hose upon one metal or other connecting pipe with like efficiency and good results.

Having thus described my invention, what I claim is—

A hose-clamp consisting of two sections, each formed of clamping jaws or bars 4 and 8, and a bar connecting them, and means for securing the two sections together, substantially as set forth.

In testimony whereof I affix my signature in presence of two witnesses.

ELIEL L. SHARPNECK.

Witnesses:
Z. F. WILBER,
JOHN C. BLAKE.